J. F. Seiberling, 2. Sheets. Sheet. 1.

Mower.

No. 3478. Reissued June 1. 1869.

Witnesses
Joel Heyton,
C. N. Wallach

Inventor
J. F. Seiberling
by his Attys
Wm. D. Baldwin

2. Sheets. Sheet. 2.

J. F. Seiberling.
Mower.

No. 3478. Reissued June. 1. 1869.

Witnesses
Joel Sayton
C. N. Wallace

Inventor
J. F. Seiberling
by his Atty
Wm. B. Salomon

UNITED STATES PATENT OFFICE.

JOHN F. SEIBERLING, OF AKRON, OHIO.

IMPROVEMENT IN HARVESTERS.

Specification forming part of Letters Patent No. 33,496, dated October 15, 1861; Reissue No. 1,701, dated June 14, 1864; Reissue No. 3,478, dated June 1, 1869.

*To all whom it may concern:*

Be it known that I, JOHN F. SEIBERLING, formerly of Doylestown, in the county of Wayne and State of Ohio, but now residing at Akron, in the county of Summit and State aforesaid, have invented certain new and useful Improvements in Harvesters, of which the following is a full, clear, and exact description, reference being had to the accompanying drawings, which make part of this specification, and in which—

Figure 1:
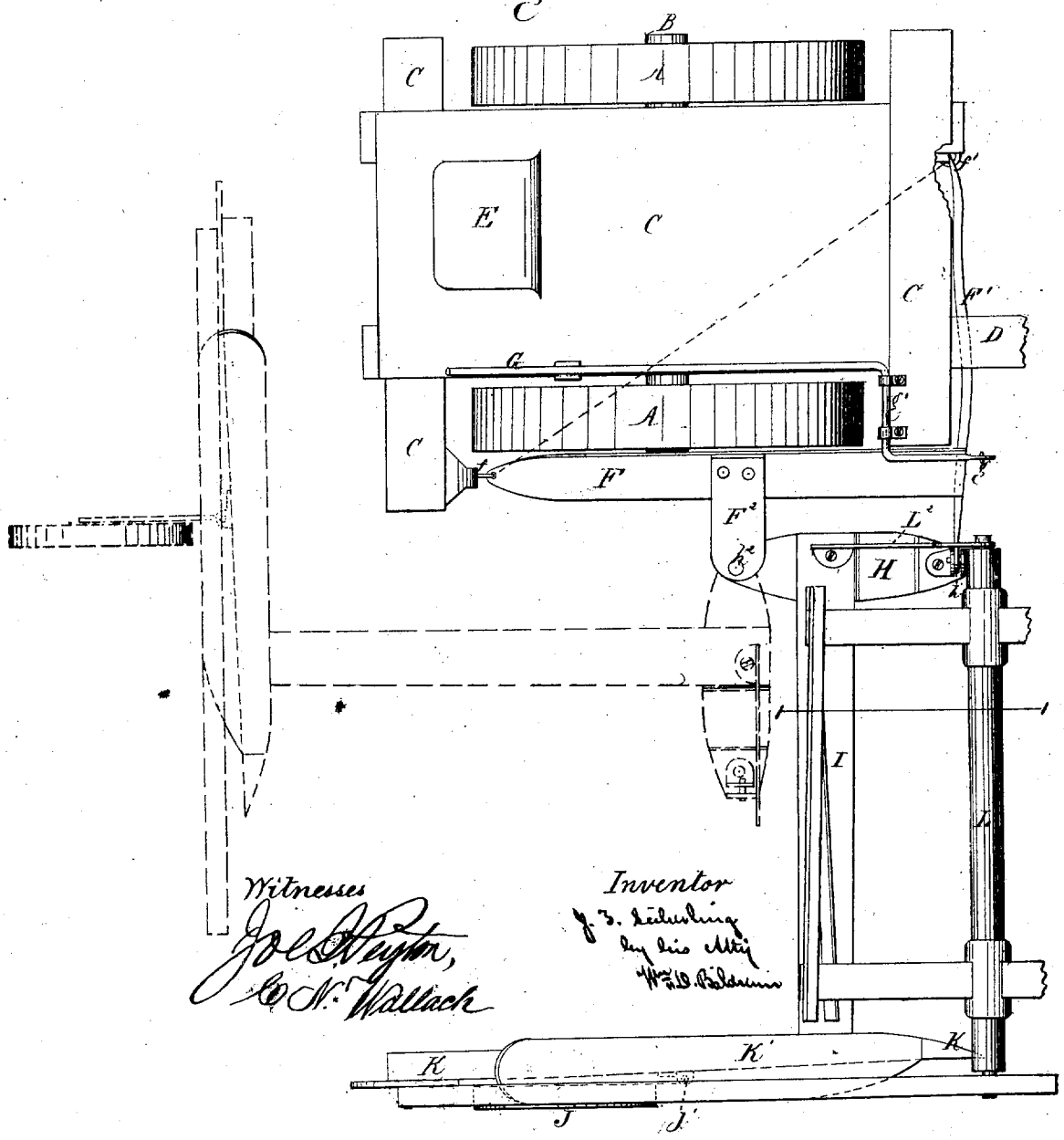
Figure 2:
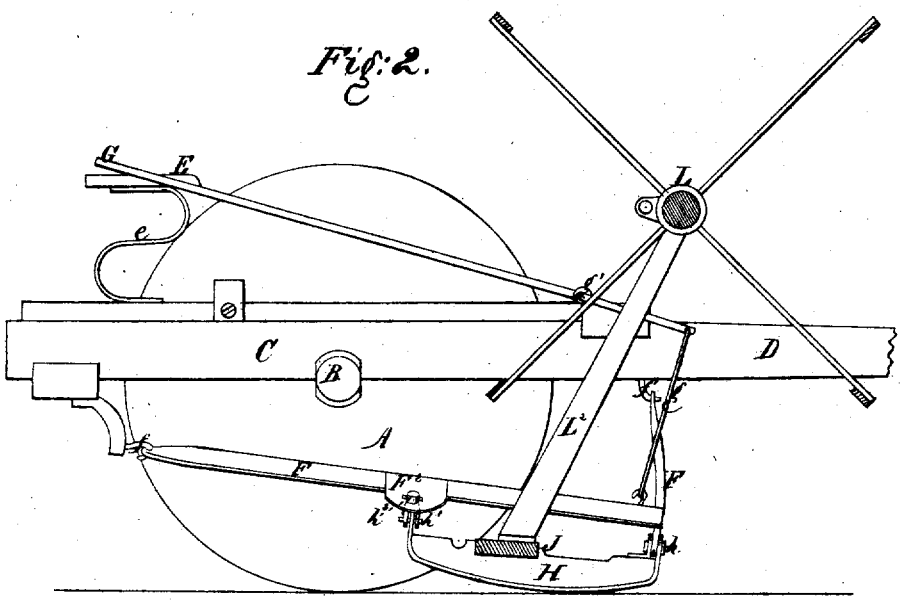
Figure 3:
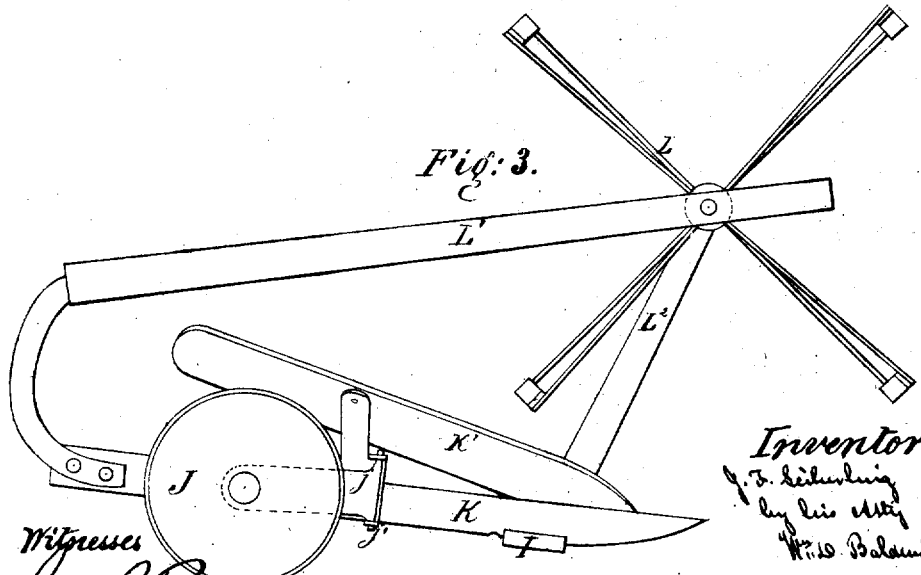

Figure 1 represents a plan or top view of so much of a machine to which my improvements are applied as is necessary to illustrate the invention herein claimed. The red lines in this figure show the attitude assumed by the finger-beam when folded for transportation. Fig. 2 represents a vertical section through the machine at the line 1 1 of Fig. 1, looking toward the main frame. Fig. 3 represents a view in elevation of the divider side of the machine.

The improvements herein claimed consist, first, in a novel method, hereinafter explained, of constructing the coupling-frame and shoe by which the finger-beam is suspended from the main frame; second, in a novel method, hereinafter explained, of connecting the coupling-frame with the shoe which carries the finger-beam; third, in a novel method, hereinafter explained, of combining a horizontally-folding jointed finger-beam with a harvester.

In order to carry out the object of the invention herein claimed, I mount a strong main frame on two driving and supporting wheels, revolving outside the frame in suitable bearings. The machine is drawn by a tongue projecting from its front end, and has a seat for the driver mounted upon it. A laterally-projecting finger-beam carrying a suitable cutting apparatus is attached at its heel end to a shoe, pivoted at one end to a coupling-arm extending from the front end of the main frame, to which it is pivoted. The other end of this shoe is pivoted to a short connection projecting from a brace-bar extending parallel, or nearly so, with the driving-wheels, and pivoted to the rear inner corner of the main frame by a swivel-joint and securely fastened to the coupling-arm above mentioned. The coupling-arm and brace-bar thus arranged form two sides of a rectangular frame, which is pivoted to the main frame, so as to vibrate on an axis diagonal to this square, thus allowing the angle of the coupling-frame, to which the finger-beam is attached, to freely rise and fall without cramping or straining the pivots. This coupling-frame is raised and lowered by a lifting-lever supported on the main frame and connected to the coupling-frame at or near its angle by a chain or cord. In combination with the short connection that projects from the brace-bar and supports the rear end of the shoe is a link, which is pivoted to the shoe and swivels in a bearing on the end of this short connection, the object of which is to allow the finger-beam to fold horizontally. The divider end of the finger-beam is supported by a wheel mounted on an arm swinging on an axis—in other words, on a caster-wheel. By detaching the pivot of the coupling-arm from the shoe and the pitman-connection the finger-beam can be swung round horizontally on its pivot, so as to be parallel to the path of the machine, and thus take up less room in moving from field to field. When so folded the caster-wheel swings round until its arm is parallel to the finger-beam, in which position it supports the divider end of the finger-beam, and thus prevents torsion of the folding joints.

In the accompanying drawings, which exemplify one practical way of carrying out the objects of my invention, two driving and supporting wheels, A A′, are shown as mounted on an axle, B, turning in suitable bearings in a main frame, C, arranged between the wheels, but projecting beyond their peripheries at each end. A tongue, D, projects from the frame near its inner front corner, and a driver's seat, E, is mounted on curved support near the outer rear corner of the frame. A strong brace-bar, F, is pivoted at its rear end to the main frame by a swivel-joint, *f*, and rigidly secured at its forward end to a coupling-arm, F′, arranged transversely thereto, and attached by a link-joint, *f′*, to the front end of the main frame. By reference to Fig. 1 it will be seen that the upper end of this coupling-arm is bent so that a line passing through it at a right angle thereto would intersect the joint *f*, as shown by the red dotted line, owing to which arrangement the finger-beam can be raised or lowered without cramping the joints. This raising and lowering is done, in this instance, by a hand-lever, G, extending forward from a point within reach of the driver, turning on a fulcrum, $g'$, on the main frame, and connected with the coupling-frame F by a rod or chain, $g$.

The finger-beam I is securely fastened to a shoe, H, pivoted at its front end by a joint, $h$, to the coupling-arm F′, and at its heel by a similar joint, $h'$, to short link $h^2$, swiveling in the end of the short connection extending from the brace-bar F. By this mode of construction the finger-beam can be swung horizontally backward until it lies parallel with the driving-wheels, as shown in red in Fig. 1. To do this the pitman and the joint $h$ must of course be first uncoupled.

The grain end of the finger-beam is provided with a suitable divider, K, and grain-board K′. In this instance the rear end of the divider is prolonged to form a support for a caster-wheel, J, mounted on an arm, $j$, turning in bearings $j'$, inclined slightly forward from a vertical line. By this mode of construction when the finger-beam is turned back parallel with the driving-wheels the caster-wheel swings out at a right angle to its supporting-arm K, as shown in red in Fig. 1, and runs in a path parallel to the driving-wheels, and still supports its end of the finger-beam, thus preventing the torsion of the joint $h^2$.

A reel, L, is mounted in an overhanging arm, L′, mounted on the divider-piece K and on a post, $L^2$, secured upon the heel end of the finger-beam. The reel may be driven in any well-known way. In mowing the reel may be removed, if preferred.

My invention is intended to be used in a fully-organized machine. I have, however, herein shown only those parts necessary to illustrate my invention, the details of construction of a reaper being well known to all skillful reaper-builders.

What I claim herein is—

1. The combination, substantially as described, of a shoe to which the finger-beam is attached, a coupling-arm pivoted at one end to the fore part of the shoe and at the other to the main frame, and a brace-bar rigidly secured to the coupling-arm at one end and pivoted to the main frame at the other, with an intermediate coupling connecting the heel of the shoe with the brace-bar, for the purposes set forth.

2. The combination, substantially as described, of a shoe extending behind the finger-beam with a swiveling link connecting the shoe and short coupling-arm, for the purpose of allowing the finger-beam to fold horizontally.

3. A short arm or connection one end of which supports the rear end of the shoe and the other end of which is rigidly combined with a brace-bar, one end of which is supported by the rear inner corner of the main frame and the other end by an arm to which it is rigidly attached, extending from the front end of the frame to which it is pivoted, for the purpose set forth.

4. The arrangement of the hinged bars F F′ for supporting the heel of the finger-beam, and for elevating and depressing the same by means of a lever, G, said hinged bars being used in connection with a shoe, H, and its flexible attachment, substantially as set forth.

J. F. SEIBERLING.

Witnesses:
JAMES GAUGHAN,
JNO. J. WAGONER.